(12) United States Patent
Matsumoto et al.

(10) Patent No.: US 7,232,960 B2
(45) Date of Patent: Jun. 19, 2007

(54) APPARATUS FOR IMPROVING DURABILITY OF ELECTRONIC DEVICES

(75) Inventors: Yasuo Matsumoto, Tokyo (JP); Kenji Shimano, Tokyo (JP); Masakazu Okumura, Tustin, CA (US); Jim Fullalove, London (GB); Martin Riddiford, London (GB); Patrick Hunt, London (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/021,234

(22) Filed: Dec. 21, 2004

(65) Prior Publication Data

US 2006/0152892 A1  Jul. 13, 2006

(51) Int. Cl.
*H05K 7/14* (2006.01)

(52) U.S. Cl. ............ 174/544; 361/681; 361/683; 361/680

(58) Field of Classification Search ........... 174/52.1, 174/544; 361/680, 683, 681
See application file for complete search history.

(56) References Cited

U.S. PATENT DOCUMENTS

| | | | |
|---|---|---|---|
| 5,583,742 A | 12/1996 | Noda et al. | |
| 5,706,168 A * | 1/1998 | Erler et al. | 361/685 |
| 6,179,122 B1 * | 1/2001 | Moncrief et al. | 206/320 |
| 6,498,719 B1 * | 12/2002 | Bridges | 361/680 |
| 6,522,763 B2 * | 2/2003 | Burleson et al. | 381/189 |
| 6,646,864 B2 * | 11/2003 | Richardson | 361/681 |
| 6,795,306 B2 * | 9/2004 | Jeffries et al. | 361/683 |
| 7,106,580 B2 * | 9/2006 | Kugimiya et al. | 361/683 |
| 2002/0043608 A1 * | 4/2002 | Nakata et al. | 248/560 |
| 2002/0044410 A1 * | 4/2002 | Nakano et al. | 361/681 |
| 2002/0179470 A1 * | 12/2002 | Lee | 206/320 |
| 2003/0076651 A1 * | 4/2003 | Tanaka et al. | 361/683 |
| 2003/0179543 A1 * | 9/2003 | Sri-Jayantha et al. | 361/683 |
| 2004/0061996 A1 * | 4/2004 | Kamphuis et al. | 361/683 |
| 2004/0136149 A1 * | 7/2004 | Wang et al. | 361/680 |
| 2004/0212954 A1 * | 10/2004 | Ulla et al. | 361/680 |

FOREIGN PATENT DOCUMENTS

JP   07-168647   7/1995

* cited by examiner

*Primary Examiner*—Hung V. Ngo
(74) *Attorney, Agent, or Firm*—Blakely Sokoloff Taylor & Zafman, LLP

(57) ABSTRACT

According to one embodiment of the invention, an electronic device comprises a main body and a protective panel. The main body features a periphery formed by a plurality of sidewalls. The protective panel is placed over a top surface of the main body and extending outwardly beyond the periphery of the main body.

15 Claims, 5 Drawing Sheets

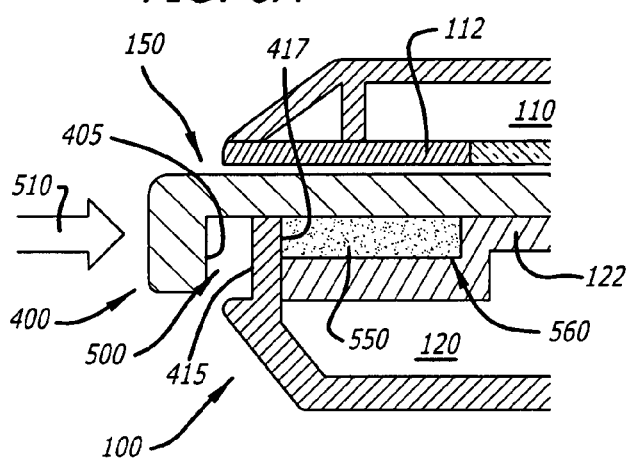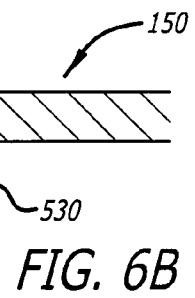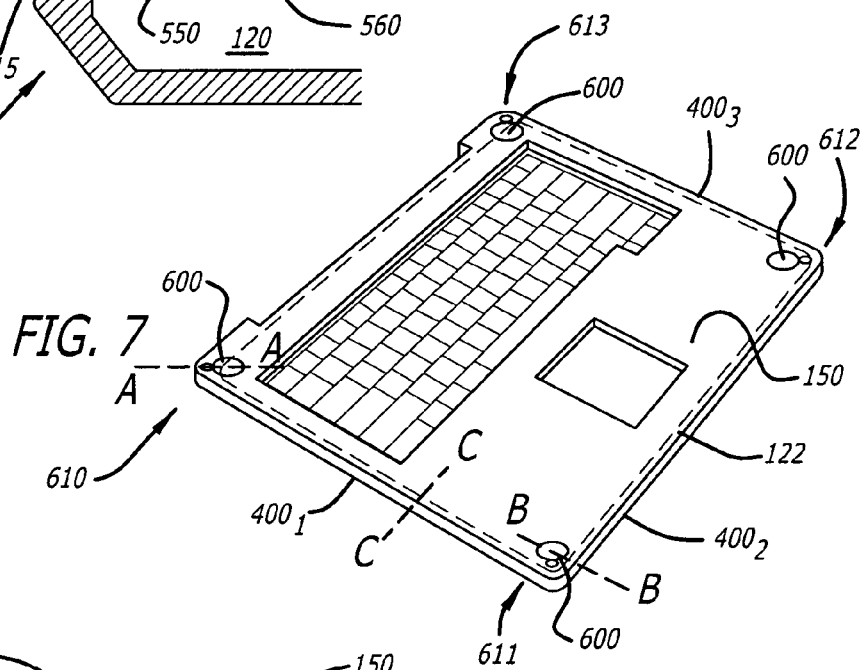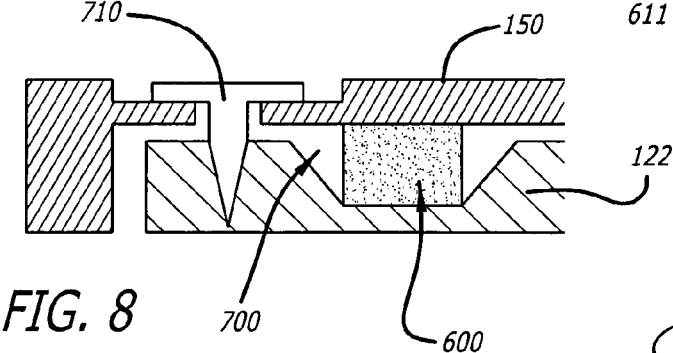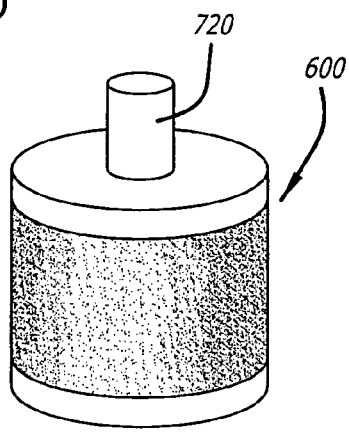

APPARATUS FOR IMPROVING DURABILITY OF ELECTRONIC DEVICES

FIELD

Embodiments of the invention generally relate to the field of electronic devices. More specifically, embodiments of this invention relate to an impact protective member positioned on an electronic device in order to prevent or reduce damage caused by unwanted impact forces.

GENERAL BACKGROUND

Over the past few years, there has been increased demand for portable computers because users are able to transport and use them at different locations. Because of their mobility, portable computers are substantially more likely to suffer unwanted impact forces. These impact forces may be as severe as dropping the computer or as mild as roughly placing one's computer bag on the ground.

Under current architectures, the main body of a portable computer is designed to absorb energy caused from minor impact forces. The main body, however, is susceptible to damage caused by impact forces above a certain threshold. In fact, substantial impact forces may not only damage the main body, but also damage or cause the malfunction of one or more of the internal components of the portable computer, especially when those internal components that are placed in precise locations within the main body. This would render the portable computer inoperable.

BRIEF DESCRIPTION OF THE DRAWINGS

Features and advantages of embodiments of the invention will become apparent from the following detailed description in which:

FIG. 6A is a cross sectional view of an impact protective panel positioned on the electronic device of FIG. 1 and having a first type of outer edge.

FIG. 6B is a cross sectional view of an impact protective panel having a second type of outer edge.

FIG. 7 is an exemplary embodiment of multiple impact decoupling members positioned between the protective panel and the top panel of FIG. 6A.

FIG. 8 is a cross-sectional view of a first embodiment of an impact decoupling member of FIG. 7 along a cross-sectional line A—A.

FIG. 9 is a perspective view of an embodiment of the impact decoupling member of FIG. 8.

DETAILED DESCRIPTION

Embodiments of the invention set forth in the following detailed description generally relate to one or more impact protective members of an electronic device that are positioned to prevent or reduce the damage caused by unexpected forces exerted on the electronic device. Various embodiments of impact protective members include an impact protective panel interposed between the main body and a display cover and extending beyond their peripheries as well as impact decoupling members described below.

In the following description, certain terminology is used to describe various features of one or more embodiments of the invention. For instance, an "electronic device" is defined as any electronic product having a cover and a main body protecting internal electronic components therein. In this detailed description, for clarity sake, the electronic device is illustrated as a notebook computer. However, it is evident that the invention may be utilized in other types of electronic devices including, but not limited or restricted to personal digital assistants (PDAs), cellular telephones, or any other type of portable computer such as hand-held computers, tablet computers and the like.

Herein, the term "rotate" as well as varying tenses thereof is generally defined as movement about an axis of rotation. The axis of rotation may be relatively fixed to the overall orientation of the electronic device. For this detailed description, when used to denote a direction of rotation, the term "vertically rotate" (or any tense thereof) relates to rotation about a generally horizontal axis of rotation. The term "lateral" or any tense thereof is defined as non-rotating, unidirectional movement.

I. Impact Protective Panel

Figure 1:
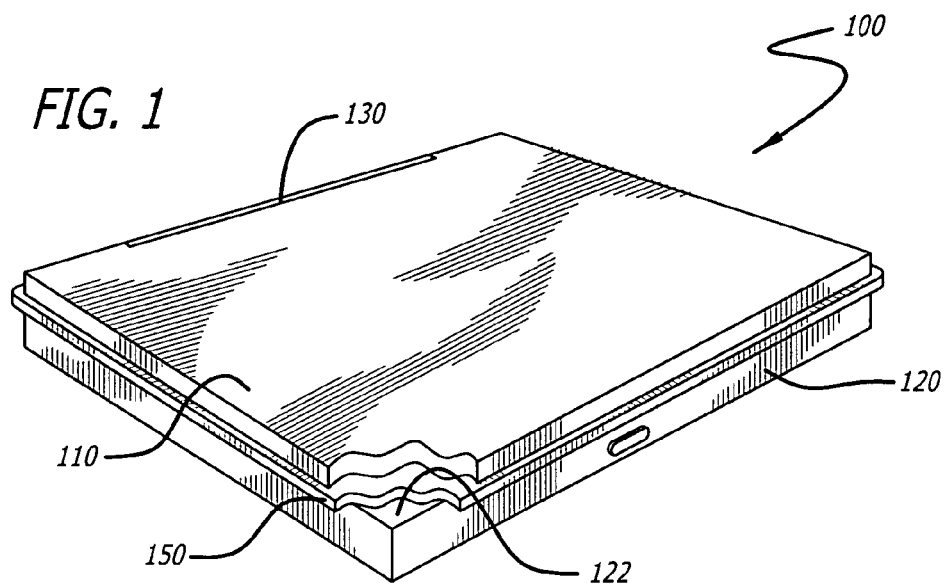
FIG. 1 is a perspective view of an exemplary embodiment of an electronic device placed in a CLOSED position and featuring a first type of impact protective member.

Referring to FIG. 1, a perspective view of an exemplary embodiment of an electronic device 100 placed in a CLOSED position and featuring a first type of impact protective member is shown. Herein, electronic device 100 comprises a cover 110 rotationally mounted on a main body 120 through a hinge mechanism 130.

Herein, according to one embodiment of the invention, an impact protective member 150 is generally implemented as a panel interposed between cover 110 and main body 120. More specifically, impact protective panel 150 is contoured so that its bottom surface is complementary with and substantially coplanar to a surface of a top panel 122 of main body 120.

According to one embodiment of the invention, protective panel 150 is sized with a thickness generally equivalent to the clearance that is normally present between cover 110 and main body 120 when electronic device 100 is placed in the CLOSED position. For example, the thickness of panel 150 may be 1–5 millimeters. Herein, protective panel 150 extends outwardly beyond the periphery of both cover 110 and main body 120 for absorbing lateral impact forces applied to electronic device 100.

Figure 2:
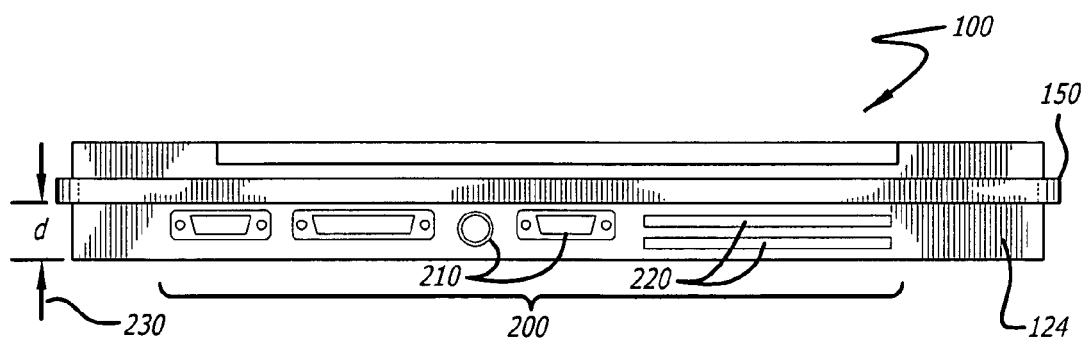
FIG. 2 is a back side view of the electronic device of FIG. 1.

As further shown in FIG. 2, a back side view of electronic device 100 of FIG. 1 is shown. Protective panel 150 outwardly protrudes from all sidewalls forming the periphery of main body 120, including a back sidewall 124. This provides an additional benefit by protecting a plurality of connectors 200 located along back sidewall 124. These connectors 200 may include, but are not limited or restricted to a serial communication connector 210 (e.g., serial communication "CPM" port or Universal Serial Bus "USB" port) or a parallel communication connector 220 (e.g., RS-232 port). The spacing "d" 230 between protective panel 150 and a bottom edge 126 of main body 120 is sufficient for each connector 200 to receive a connector plug.

Figure 3:
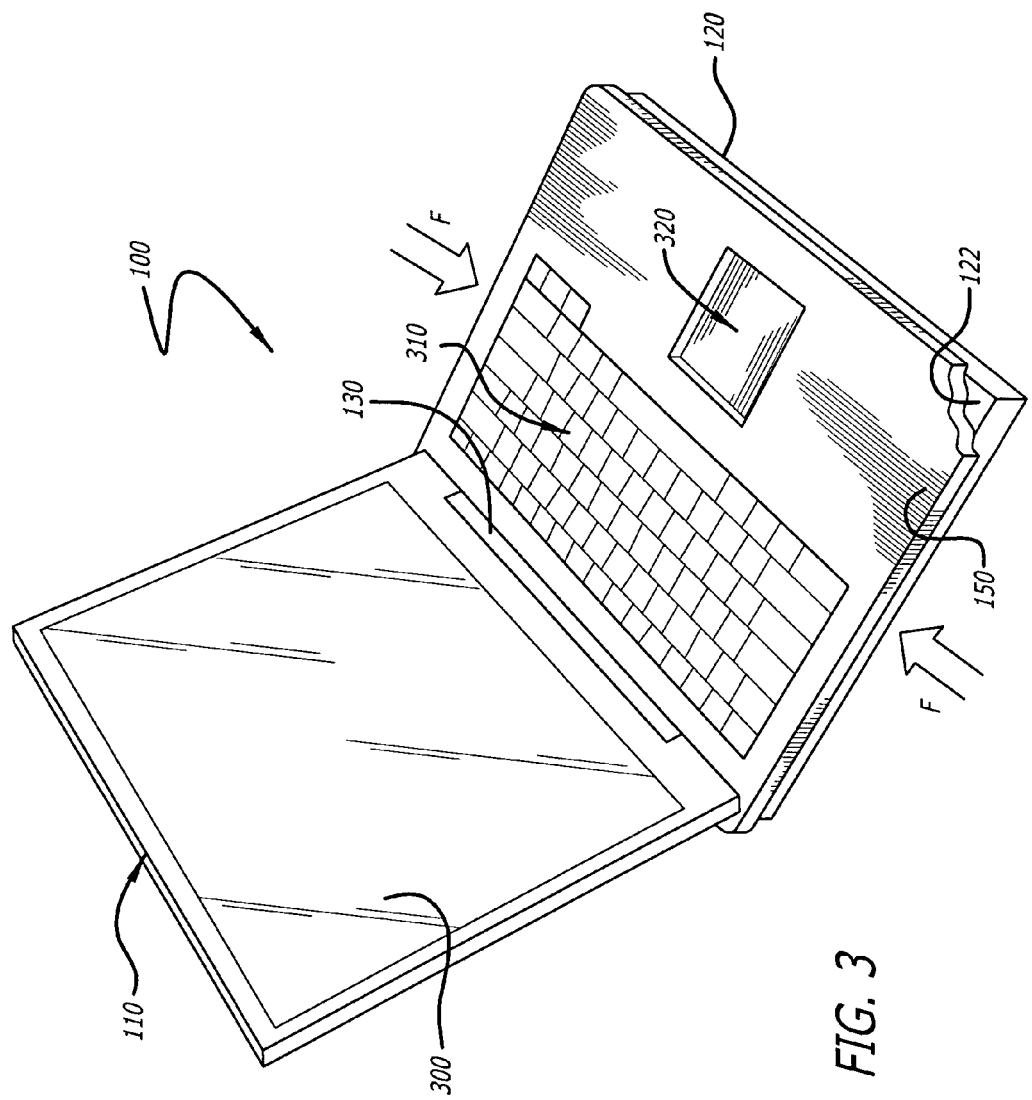
FIG. 3 is a perspective view of the electronic device of FIG. 1 placed in an OPENED position.

Referring now to FIG. 3, a perspective view of electronic device 100 placed in an OPENED position is shown. Cover 110 includes a flat panel display 300 as well as all or part of the circuitry for generating a displayable image on flat panel display 300 such as a liquid crystal display (LCD) for example.

In accordance with this embodiment, cover 110 is rotationally coupled to main body 120 by hinge mechanism 130. Hinge mechanism 130 may be adapted as one or more friction hinges such as a brake hinge for example. This allows cover 110 to be vertically rotated and maintained in any selected angle ($\alpha$) of rotation, where $0° \leq \alpha < 180°$. It is contemplated, however, that hinge mechanism 130 need not include brake hinges when there is no need for maintaining cover 110 at an angled orientation.

Main body 120 comprises an alphanumeric character input unit 310 (e.g., keyboard, keypad, etc.) and a cursor control unit 320 (e.g., touch pad, tactile device, track ball etc.), which are positioned on a top panel 122 of main body 120. According to one embodiment, alphanumeric character input unit 310 and cursor control unit 320 may be implemented on a separate panel, which is affixed to main body 120 and operates as top panel 122.

Of course, it is contemplated that alphanumeric character input unit 310 and cursor control unit 320 may be integrated as part of top panel 122 formed with one or more of the sidewalls of main body 120 or may be integrated as part of protective panel 150. For clarity sake, the embodiment featuring alphanumeric character input unit 310 and cursor control unit 320 as a keyboard and touch pad implemented on a separate panel forming top panel 122 is described below in detail.

Protective panel 150 is attached to main body 120 through a mounting mechanism (not shown) and is configured with cut-out areas to allow the user access to keyboard 310 and cursor control unit 320. Protective panel 150 is adapted to absorb energy caused by impact forces identified by arrow "F" substantial enough to laterally move panel 150 by a measurable distance (e.g., 1–2 millimeters). This panel 150 reinforces electronic device 100 against most impacts caused by dropping or collision.

Figure 4:
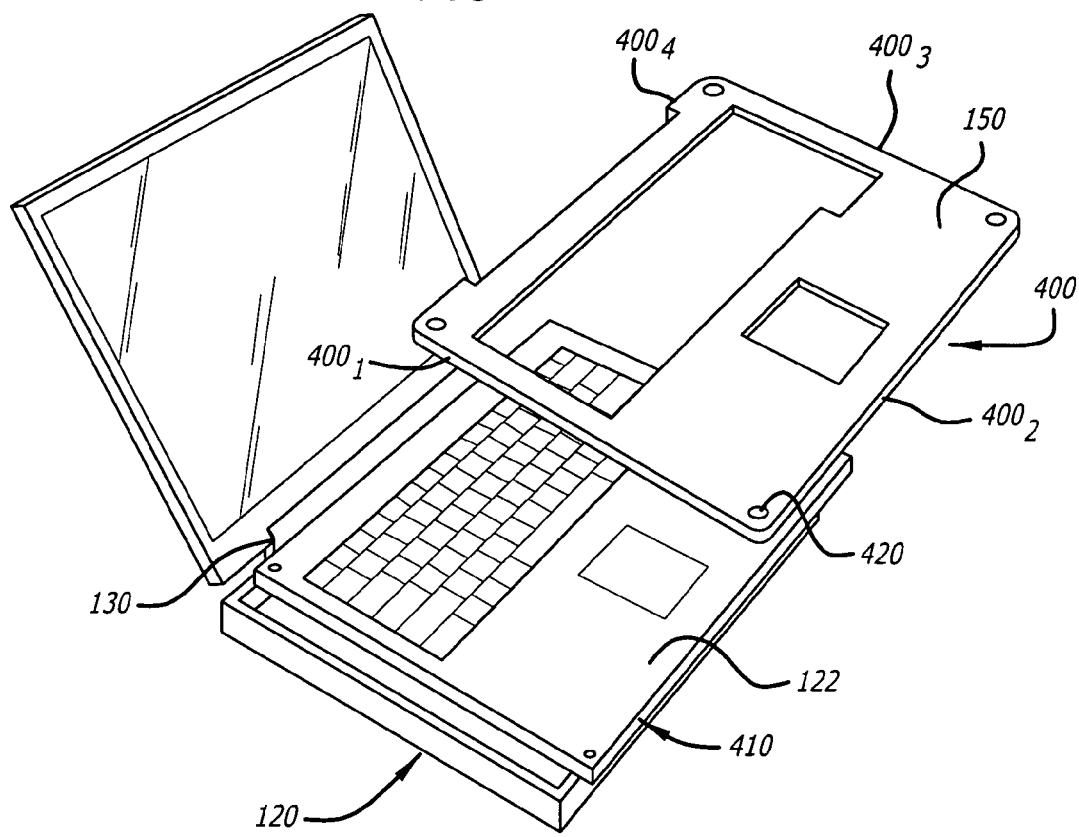
FIG. 4 is a first exemplary embodiment of an impact protective panel of FIG. 1.

Referring to FIG. 4, a first exemplary embodiment of protective panel 150 of FIG. 1 is shown. Protective panel 150 is adapted as a panel sized to overlap a substantial portion of top panel 122 of main body 120 and extend beyond at least one edge of top panel 122. According to this embodiment of the invention, a plurality of outer edges 400, more specifically outer edges $400_1$–$400_4$ forming the periphery of protective panel 150, extend outwardly beyond sidewalls 410 of main body 120 as shown in detail in FIGS. 5 and 6A.

Figure 5:
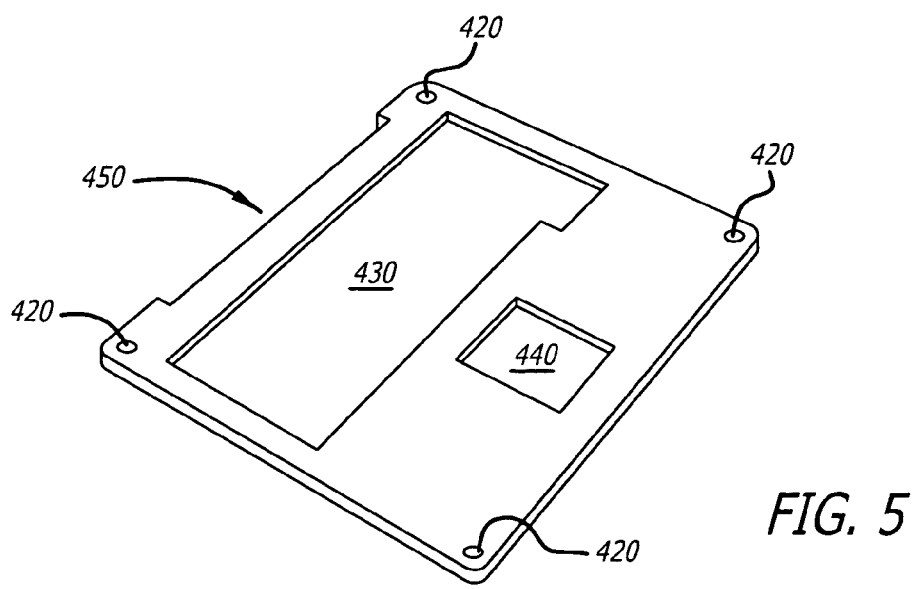
FIG. 5 is an exemplary embodiment of the protective panel of FIG. 4 mounted onto a top panel of the main body of the electronic device.

As shown in FIGS. 4 and 5, protective panel 150 is attached to top panel 122 of main body 120. This attachment allows for lateral movement of a few millimeters in response to impact forces exerted thereon. According to one embodiment of the invention, protective panel 150 may feature fastening slots 420 shaped to enable lateral movement despite insertion of mounting screws through slots 420.

As further illustrated, protective panel 150 comprises a plurality of cut-out areas 430 and 440 which provide a user access to keyboard 310 and touch pad 320, respectively. Protective panel 150 further comprises a recessed area 450 to avoid interference with the operability of hinge mechanism 130 when mounted on top panel 122.

Referring to FIG. 6A, a cross sectional view of protective panel 150 positioned on electronic device 100 is shown. Protective panel 150 is interposed between bottom panel 112 of cover 110 and top panel 122 of main body 120. Protective panel 150 comprises outer edge 400 having a curved cross-section (e.g., "L" shaped cross-section), which establishes a spacing 500 between an interior surface 405 of outer edge 400 and an overlapped exterior surface 415 of sidewall 410 of main body 120. The desired distance of spacing 500 may be easily determined based on the results observed for certain levels of impact forces caused by collisions. As an example, spacing 500 is adapted to be approximately 2 or more millimeters in width.

As identified by arrow 510, lateral impact forces on panel 150 would cause movement of panel 150 in a lateral direction. Depending on the degree and angle of impact force 510 applied to electronic device 100, it is unlikely that impact force 510 would cause interior surface 405 of the outer edge 400 to come in contact with exterior sidewall surface 415. However, in the event that impact force 510 is severe enough to cause interior surface 405 of outer edge 400 to move laterally and come in contact with exterior sidewall surface 415 of main body 120, additional impact protective members may be positioned to lesson the impact force applied to main body 120.

For instance, according to one embodiment of the invention, an additional impact protective member may be implemented by altering outer edge 400 of protective panel 150. As shown in FIG. 6B, outer edge 400 may be configured with a L-shaped cross-section featuring padding material 540 inserted between an exterior portion 520 and an interior portion 530 of outer edge 400. These portions may be different cross-sectional forming outer edge 400. The "padding material" 540 provides additional absorption of energy caused by the impact and may be rubber, foam or some other elastic material.

In lieu of or in addition to the impact protective member of FIG. 6B, an optional impact decoupling member 550 may be positioned within a recessed area 560 formed along top panel 122 of main body 120 as shown in FIG. 6A. Recessed area 560 is partially bordered by an interior surface 417 of sidewall 410. Panel 150 is positioned over and coupled to impact decoupling member 550 as shown.

II. Impact Decoupling Member

Referring now to FIG. 7, an exemplary embodiment of multiple impact decoupling members 600 positioned between protective panel 150 and top panel 122 of main body 120 of FIG. 6A is shown. According to one embodiment of the invention, impact decoupling members 600 are positioned approximate to each corner 610–613 of electronic device 100. This positioning of impact decoupling members 600 mitigates impact forces applied to panel 150 and subsequently main body 120 from virtually any angle along the periphery of electronic device 100.

Referring to FIG. 8, a cross-sectional view of a first embodiment of an impact decoupling member 600 of FIG. 7 along cross-sectional line A—A is shown. Impact decoupling member 600 is interposed between top panel 122 of main body 120 and protective panel 150. For instance, decoupling member 600 may be mounted on protective panel 150 or situated within a recessed area 700 of top panel 122 but coupled to protective panel 150. Protective panel 150 is moveably coupled to the top panel 122 through one or more screws 710 or any other type of fastening mechanisms such as adhesive bonding and the like.

According to one embodiment of the invention, impact decoupling member 600 is a rubber foam insert as shown in FIG. 9. Herein, the rubber foam insert features an axle 720 that is inserted into a corresponding recessed portion of protective member 150 and may be fixedly attached thereto. Since recessed area 700 is configured complementary to the structure of the rubber foam insert, for this embodiment, recessed area 700 would be a generally cylindrical area to accommodate the cylindrical rubber foam insert.

Figure 10:
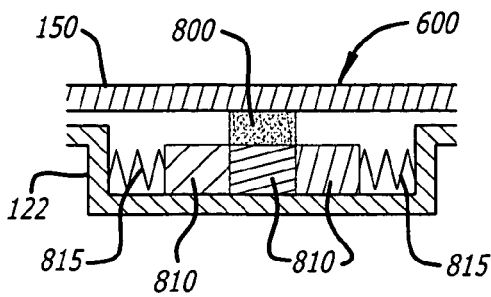
FIG. 10 is a cross-sectional view of a second embodiment of an impact decoupling member of FIG. 7 along a cross-sectional line B—B.
Figure 11A:
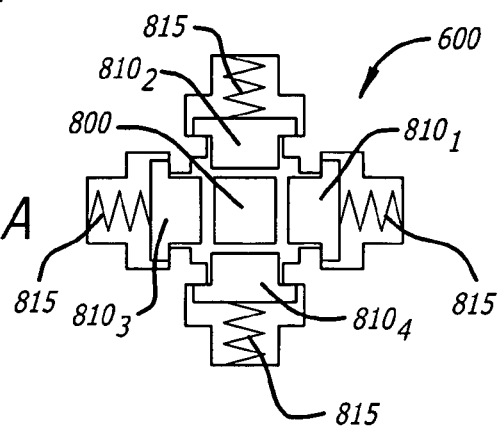
FIG. 11A is a perspective view of one embodiment of the impact decoupling member of FIG. 10.

Referring now to FIG. 10, a cross-sectional view of a second embodiment of an impact decoupling member 600 of FIG. 7 along a cross-sectional line B—B is shown. Similarly, impact decoupling member 600 is positioned within a recessed area between top panel 122 and protective panel 150. A pad 800 made of padding material is coupled to protective panel 150 and surrounded by a plurality of spring biased impact resistive members 810 such as impact resistive members $810_1$–$810_4$ set forth in FIG. 11A Hence, as shown in FIG. 11A, impact decoupling member 600 is adapted to lessen the movement of the protective panel upon experiencing impact forces. More specifically, an impact force on impact protective panel 150 of FIG. 10 will cause one or perhaps two resistive members 810 to compress their corresponding springs 815. This compression reduces the amount of lateral movement experienced by protective panel 150, and thus, eliminates or reduces the amount of impact realized by the main body.

For instance, as an illustrated example, an impact force is applied to protective panel 150 of FIG. 10. This impact causes movement of panel 150, and thus, movement of pad 800 toward an impact resistive member (e.g., member $810_1$). Pad 800 further provides some flexibility as to absorb some of the energy from the impact. Depending on the amount of gravitational forces (g-forces) applied by the impact, resistive member $810_1$ may further compress its spring 815 so that impact decoupling member 600 absorbs most of the energy from the impact, and thus, does not cause the energy from the impact to be reverberated throughout the main body.

Referring to both FIGS. 7 and 11A, it is contemplated that the plurality of spring biased impact resistive members 810, namely members $810_1$–$810_4$ positioned within respective corners 610–613 of the electronic device shown in FIG. 7, may differ in number from four (4) resistive members shown in FIG. 11A. For instance, corner 611 may be implemented with pad 800 and two resistive members $810_1$ & $810_2$ having springs generally orthogonal to outer edges $400_1$ & $400_2$, respectively. Similarly, corner 612 may be implemented with a decoupling member including pad 800 and two resistive members $810_3$ & $810_2$ having springs generally orthogonal to outer edges $400_2$ & $400_3$, respectively. In general, impact decoupling members 600 may be adapted with two or more resistive members.

Figure 11B:
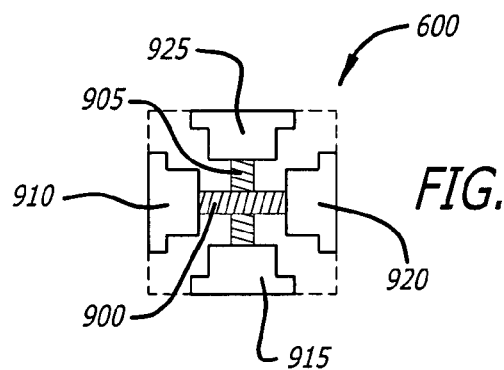
FIG. 11B is a perspective view of another embodiment of the impact decoupling member of FIG. 10.

Referring now to FIG. 11B, the respective view of another embodiment of an impact decoupling member 600 is shown. Herein, at least two substantially elastic elements 900 and 905 are positioned transverse to each other and attached to the protective panel. Embodiments of these elements 900 and 905 may include springs, padding material with elastic characteristics or the like.

A first element 900 is interposed between a first and third impact resistive members 910 and 920, which would be formed within the top panel of the main body. A second element 905 is interposed between a second and fourth impact resistive members 915 and 925 of the top panel, respectively. The "impact resistive members" may be hardened plastic or any other durable composition.

In response to an impact force being exerted on the protective panel, first element 900 is compressed to absorb the energy associated with the impact force. In the event that the impact force is from a direction supported by the second or fourth impact resistive member 915 or 925, second element 905 is compressed to absorb the energy caused by the impact force.

As an alternative embodiment, elements 900 and 905 may be coupled to the top panel. As a result, impact resistive members 910, 915, 920, 925 would be coupled to the protective panel.

Figure 12A:
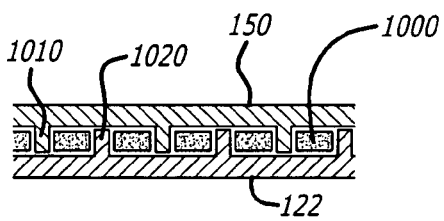
FIG. 12A is a cross-sectional view of a third embodiment of an impact decoupling member of FIG. 7 along a portion of the cross-sectional line C—C.
Figure 12B:
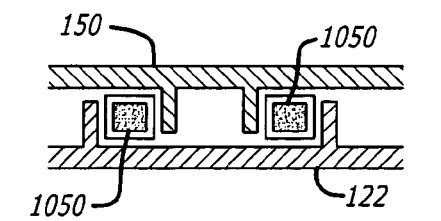
FIG. 12B is a cross-sectional view of a fourth embodiment of an impact decoupling member of FIG. 7 along a portion of the cross-sectional line C—C.
Figure 12C:
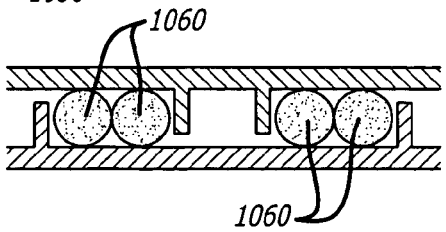
FIG. 12C is a cross-sectional view of a fifth embodiment of an impact decoupling member of FIG. 7 along a portion of the cross-sectional line C—C.

Referring now to FIGS. 12A–12C, cross-sectional views of different embodiments of impact decoupling members positioned along portions of the cross-sectional line C—C is shown. With respect of FIG. 12A, decoupling member 1000 may be dispersed between panel 150 and top panel 122. As shown, decoupling member 1000 is interspersed between interlocking protrusions 1010 and 1020 formed within panel 150 and top panel 122. Besides padding material, decoupling member 1000 may be formed out of other types of malleable compositions such as viscous fluid-filled O-rings for example.

In contrast, instead of placing impact decoupling members interspersed between each interlocking pair of protrusions formed within panels 122 and 150 as shown in FIG. 12A, decoupling members 1050 may be positioned in a staggered pattern as shown in FIG. 12B or in multiples 1060 in a staggered pattern as shown in FIG. 12C.

While certain exemplary embodiments of the invention have been described and shown in the accompanying drawings, it is to be understood that such embodiments are merely illustrative of and not restrictive on the board aspects of various embodiments of the invention, and that these embodiments not be limited to the specific constructions and arrangements shown and described, since various other modifications are possible.

What is claimed is:

1. An electronic device, comprising:
   a main body with a periphery formed by a plurality of sidewalls; and
   a protective panel placed over a top surface of the main body and extending outwardly beyond the periphery of the main body, the protective panel including a plurality of outer edges forming a periphery of the protective panel, each of the plurality of outer edges being separated from a corresponding sidewall of the main body by a predetermined spacing; and
   a display rotationally mounted on the main body, the protective panel interposed between a bottom panel of the display and a top panel of the main body.

2. An electronic device according to claim 1, wherein the protective panel includes a recessed area to avoid interference with operability of a hinge mechanism coupling the display to the main body and a plurality of cut-out areas sized to provide a user access to a keyboard and a touch pad implemented on the main body.

3. An electronic device according to claim 1, wherein the predetermined spacing is in a range of 2–4 millimeters between an interior surface of an outer edge of the protective panel and an exterior surface of a corresponding sidewall of the main body.

4. An electronic device according to claim 1, wherein the protective panel includes a plurality of outer edges forming a periphery of the protective panel, each of the plurality of outer edges includes padding material placed between an exterior portion of the outer edge and an interior portion of the outer edge.

5. An electronic device according to claim 1, further comprising a decoupling member positioned between the protective panel and a top panel of the main body, the decoupling member to absorb energy caused by an impact force against the protective panel.

6. An electronic device according to claim 5, wherein the decoupling member includes padding material coupled to the protective panel and placed within a recess formed within the top panel of the main body.

7. An electronic device according to claim 5, wherein the decoupling member includes a pad surrounded by a plurality of spring-biased members, the pad being coupled to the protective panel and, in response to the impact force, coming into contact with one of the plurality of spring-biased members to cause compression of a spring associated with the one of the plurality of spring-biased members.

8. An electronic device according to claim 5, wherein the decoupling member includes at least two substantially elastic elements positioned transverse to each other and attached to one of the protective panel and the top panel of the main body, a first substantially elastic element interposed between a first pair of impact resistive members and a second substantially elastic element interposed between a second pair of impact resistive members.

9. An electronic device according to claim 1, wherein the protective panel includes a recessed area to avoid interference with operability of a hinge mechanism coupling the display to the main body and at least one cut-out area sized to provide a user access to an alphanumeric character input unit implemented on the main body.

10. An electronic device, comprising:
a main body;
a protective panel substantially covering a top surface of the main body and extending outwardly beyond a periphery of the main body; and
a decoupling member positioned between the top surface of the main body and the protective panel, the decoupling member to absorb energy caused by an impact force against the protective panel; and
a display rotationally mounted on the main body the protective panel interposed between a bottom panel of the display and a top panel of the main body.

11. An electronic device according to claim 10, wherein the protective panel includes a plurality of outer edges forming a periphery of the protective panel, each of the plurality of outer edges separated by a predetermined spacing from a sidewall of the main body.

12. An electronic device according to claim 11, wherein the predetermined spacing is in a range of 2–4 millimeters between an interior surface of an outer edge of the protective panel and an exterior surface of a corresponding sidewall of the main body.

13. An electronic device according to claim 10, wherein the decoupling member includes padding material coupled to the protective panel and placed within a recess formed within a top panel of the main body.

14. An electronic device according to claim 10, wherein the decoupling member includes a padding material surrounded by a plurality of spring-biased members, the padding material attached to the protective panel and, in response to the impact force, coming into contact with one of the plurality of spring-biased members to cause compression of a spring associated with the one of the plurality of spring-biased members.

15. An electronic device according to claim 10, wherein the decoupling member includes at least two substantially elastic elements positioned transverse to each other and attached to one of the protective panel and a top panel of the main body, a first substantially elastic element interposed between a first pair of opposing impact resistive members and a second substantially elastic element interposed between a second pair of opposing impact resistive members.

* * * * *